United States Patent
Lee et al.

(10) Patent No.: US 9,705,546 B2
(45) Date of Patent: Jul. 11, 2017

(54) METHOD AND DEVICE FOR EMBEDDED SIM PROVISIONING

(71) Applicant: Samsung Electronics Co., Ltd., Gyeonggi-do (KR)

(72) Inventors: Sang Soo Lee, Gyeonggi-do (KR); Duc Key Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/803,946

(22) Filed: Jul. 20, 2015

(65) Prior Publication Data
US 2016/0020802 A1    Jan. 21, 2016

(30) Foreign Application Priority Data
Jul. 19, 2014    (KR) .......................... 10-2014-0091393

(51) Int. Cl.
| | |
|---|---|
| *H04M 1/66* | (2006.01) |
| *H04M 1/68* | (2006.01) |
| *H04M 3/16* | (2006.01) |
| *H04B 1/38* | (2015.01) |
| *H04B 1/3816* | (2015.01) |
| *H04W 8/20* | (2009.01) |

(Continued)

(52) U.S. Cl.
CPC ............ *H04B 1/3816* (2013.01); *H04W 8/18* (2013.01); *H04W 8/205* (2013.01); *H04W 12/06* (2013.01)

(58) Field of Classification Search
CPC ....... H04B 1/3816; H04W 8/18; H04W 12/06
USPC .......................................... 455/410–411, 558
See application file for complete search history.

(56) References Cited

U.S. PATENT DOCUMENTS

| | | | |
|---|---|---|---|
| 8,612,393 | B2 | 12/2013 | Huang et al. |
| 2008/0235266 | A1 | 9/2008 | Huang et al. |

(Continued)

FOREIGN PATENT DOCUMENTS

| | | |
|---|---|---|
| KR | 1020130049730 | 5/2013 |
| KR | 1020140058377 | 5/2014 |

(Continued)

OTHER PUBLICATIONS

GSM Association, "Embedded SIM Remote Provisioning Architecture", Version 1.1, Official Document 12FAST.13, Dec. 17, 2013, 84 pages.

(Continued)

*Primary Examiner* — Simon Nguyen
(74) *Attorney, Agent, or Firm* — The Farrell Law Firm, P.C.

(57) ABSTRACT

A method and an electronic device are provided for embedded SIM (eSIM) provisioning. The electronic device includes a first interface configured to transmit a request message for requesting a profile from a profile generation server, and to receive a plurality of packets associated with installation of the profile, in response to the request message; a processor configured to generate an image file from the plurality of packets; an authentication module configured to perform authentication with the profile generation server and authenticate an electronic device including an embedded SIM (eSIM); and a second interface configured to connect the server device to the electronic device, and to transmit the image file to the electronic device, if the electronic device is authenticated.

20 Claims, 6 Drawing Sheets

(51) Int. Cl.
*H04W 8/18* (2009.01)
*H04W 12/06* (2009.01)

(56) References Cited

U.S. PATENT DOCUMENTS

| | | | |
|---|---|---|---|
| 2009/0058635 A1* | 3/2009 | LaLonde | A61N 1/37282 340/539.11 |
| 2012/0190354 A1* | 7/2012 | Merrien | H04W 4/001 455/422.1 |
| 2013/0023235 A1 | 1/2013 | Fan et al. | |
| 2013/0227646 A1* | 8/2013 | Haggerty | H04L 63/0853 726/3 |
| 2013/0227659 A1* | 8/2013 | Raleigh | G06Q 10/06375 726/5 |
| 2013/0310001 A1 | 11/2013 | Midkiff | |
| 2013/0339305 A1* | 12/2013 | Kim | G06F 17/30283 707/652 |
| 2013/0344864 A1 | 12/2013 | Park et al. | |
| 2014/0004827 A1* | 1/2014 | O'Leary | H04W 8/22 455/411 |
| 2014/0031012 A1* | 1/2014 | Park | H04W 12/06 455/411 |
| 2014/0045460 A1 | 2/2014 | Park et al. | |
| 2014/0082358 A1 | 3/2014 | Nakhjiri et al. | |
| 2014/0308991 A1 | 10/2014 | Lee et al. | |
| 2014/0329502 A1* | 11/2014 | Lee | H04W 12/06 455/411 |
| 2014/0373124 A1* | 12/2014 | Rubin | H04L 67/28 726/7 |
| 2015/0121066 A1* | 4/2015 | Nix | H04W 52/0235 713/155 |
| 2015/0163056 A1* | 6/2015 | Nix | H04L 9/0869 380/46 |
| 2015/0281198 A1* | 10/2015 | Lee | H04W 8/18 726/7 |
| 2015/0281964 A1* | 10/2015 | Seo | H04L 63/102 726/9 |
| 2015/0302398 A1* | 10/2015 | Desai | G06F 8/60 705/41 |
| 2015/0350881 A1* | 12/2015 | Weiss | H04W 4/001 455/558 |
| 2016/0087957 A1* | 3/2016 | Shah | H04L 63/205 726/1 |
| 2016/0105792 A1* | 4/2016 | Mohammed | H04W 8/205 455/418 |
| 2016/0212617 A1* | 7/2016 | Koshimizu | H04L 9/0844 |

FOREIGN PATENT DOCUMENTS

| | | |
|---|---|---|
| KR | 1020140064601 | 5/2014 |
| WO | WO 2014/000157 | 1/2014 |
| WO | WO 2014/077544 | 5/2014 |

OTHER PUBLICATIONS

International Search Report dated Nov. 24, 2015 issued in counterpart application No. PCT/KR2015/007504, 4 pages.
European Search Report dated Dec. 4, 2015 issued in counterpart application No. 15177573.1-1854, 9 pages.

* cited by examiner

METHOD AND DEVICE FOR EMBEDDED SIM PROVISIONING

PRIORITY

This application claims priority under 35 U.S.C. §119(a) to Korean Patent Application Serial No. 10-2014-0091393, which was filed in the Korean Intellectual Property Office on Jul. 19, 2014, the entire disclosure of which is incorporated herein by reference.

BACKGROUND

1. Field of the Invention

The present invention relates generally to a method and a device for embedded subscriber identity module (SIM) provisioning.

2. Description of the Related Art

Unlike conventional removable smart cards, such as a SIM card, a universal SIM (USIM) card, and a universal integrated circuit (IC) card (UICC), which can be removed installed into and removed from a terminal by a user, embedded smart carts, such as an embedded UICC (eUICC) card or an embedded SIM (eSIM) card (hereinafter, collectively referred to as an "eSIM") are fixedly mounted in a terminal during manufacturing of the terminal, and may not be removed by a user.

An eSIM may allow a user of a terminal to subscribe to, change, or cancel a mobile communication service in an "over the air" (OTA) manner, without visiting a business agent of a mobile network operator (MNO).

Currently, an eSIM, which does not have any subscription information recorded therein, may be installed in an electronic device to be sold to a user. After purchasing the device, the user may then connect to a desired provider network and download a subscriber profile (e.g., an MNO profile) including subscription information onto the eSIM in an OTA manner. For example, the subscriber profile may be transmitted to the eSIM through servers, such as subscription manager data preparation (SM-DP) server and subscription manager-secure routing (SM-SR) server. Herein, a procedure for downloading and installing a subscriber profile on an eSIM may be referred to as a "provisioning procedure" or "provisioning".

For OTA provisioning, before subscribing to a mobile communication service, an electronic device may connect to a mobile communication network to download a subscriber profile. In general, a communication provider sells an electronic device to a user, where the electronic device includes an eSIM with a provisioning profile already stored therein. Using the provisioning profile the electronic device can connect to a mobile communication network, even before first downloading a subscriber profile. Basically, the electronic device connects to the mobile communication network using the provisioning profile, and then downloads and installs a first subscriber profile.

Figure 1:
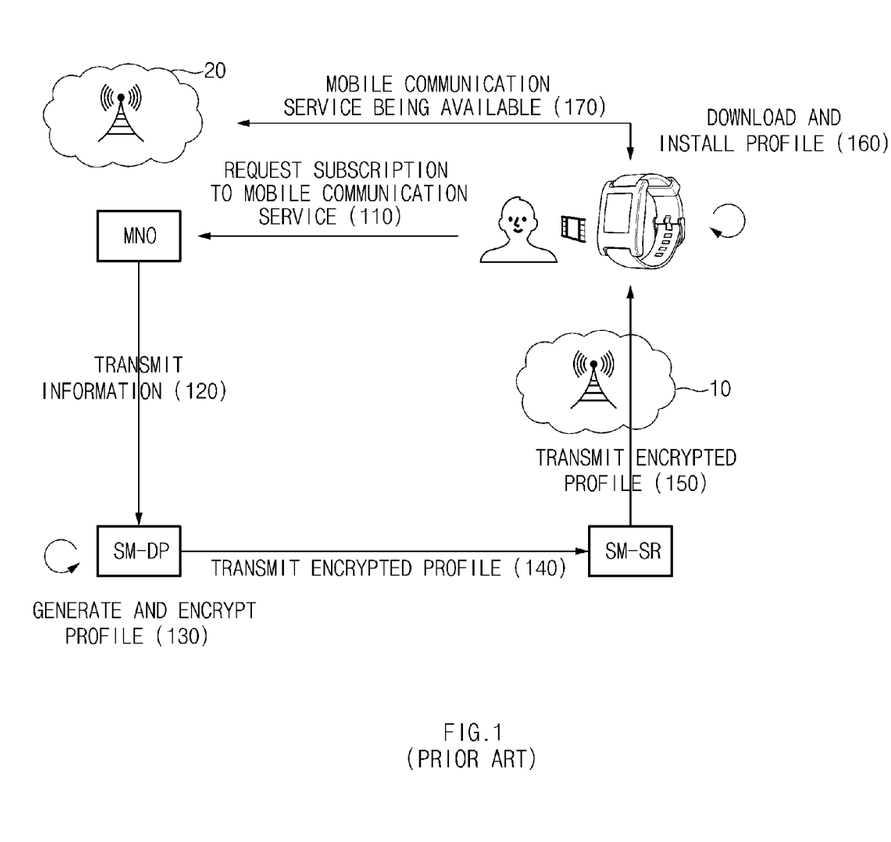
FIG. 1 illustrates a conventional OTA provisioning process.

FIG. 1 illustrates a conventional OTA provisioning process.

Referring to FIG. 1, a user who has purchased an electronic device equipped with an eSIM subscribes to a mobile communication service through an MNO in operation 110. In operation 120, the MNO transmits information for an SM-DP to generate a subscriber profile for the user, to the SM-DP. For example, the transmitted may include subscription information, an eUICC-ID (EID), an integrated circuit card ID (ICCID), an SM-SR ID (SRID), etc.

In operation 130, the SM-DP generates and encrypts a subscriber profile, based on the received information.

In operation 140, the SM-DP transmits the encrypted subscriber profile to the SM-SR. For example, the SM-DP may establish a secure transmission (or transport) channel through authentication with the SM-SR.

In operation 150, the SM-SR receives the encrypted subscriber profile from the SM-DP, triggers an OTA session 10 through a provisioning profile included in the eSIM of the electronic device purchased by the user, and transmits the encrypted subscriber profile to the eSIM of the electronic device through the OTA session 10. In operation 160, the electronic device receives and installs a subscriber profile on the eSIM, using the encrypted subscriber profile.

In operation 170, the electronic device uses a mobile communication service through a network 20, which the MNO provides, based on the installed subscriber profile.

When using the above-described provisioning procedure, it can take a markedly long time (e.g., a minute unit) for the SM-DP to transmit a plurality of application protocol data units (APDUs) to the electronic device in the OTA session 10. Further, the above-described provisioning may be unsuitable for installing or changing a profile (a subscriber profile or a provisioning profile) in bulk by an electronic device manufacturer.

SUMMARY

Accordingly, an aspect of the present invention is to provide an eSIM provisioning method and an electronic device (e.g., a server) capable of downloading a profile to another electronic device (e.g., a terminal) within a short time.

Another aspect of the present disclosure is to provide an eSIM provisioning method and an electronic device (e.g., a terminal) capable of downloading a profile from another electronic device (e.g., a server) within a short time.

In accordance with an aspect of the present invention, an electronic device is provided, which includes a first interface configured to transmit a request message for requesting a profile from a profile generation server, and to receive a plurality of packets associated with installation of the profile, in response to the request message; a processor configured to generate an image file from the plurality of packets; an authentication module configured to perform authentication with the profile generation server and authenticate an electronic device including an embedded SIM (eSIM); and a second interface configured to connect the server device to the electronic device, and to transmit the image file to the electronic device, if the electronic device is authenticated.

In accordance with another aspect of the present invention, an eSIM provisioning method is provided, which includes transmitting a request message for requesting a profile; receiving a plurality of packets associated with installation of a profile, from a profile generation server, in response to the request message; generating an image file corresponding to the profile from the plurality of packets; authenticating an electronic device including an eSIM and on which the profile is to be installed; and transmitting the image file to the electronic device, if the electronic device is authenticated.

In accordance with another aspect of the present invention, an electronic device is provided, which includes an authentication module configured to authenticate at least one of a server and an external device connected with the electronic device to transmit a profile to the electronic device; a memory configured to store data received from the at least one of the server and the external device authenticated by the authentication module; an embedded SIM (eSIM) on which the profile is installed; and a processor configured to initiate a process of installing the profile on the eSIM using an image file, based on whether an input event is received.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numbers are used to depict the same or similar elements, features, and structures.

DETAILED DESCRIPTION OF EMBODIMENTS OF THE INVENTION

Various embodiments of the present invention may be described with reference to accompanying drawings. Accordingly, those of ordinary skill in the art will recognize that modifications, equivalents, and/or alternatives of the various embodiments described herein can be made without departing from the scope and spirit of the present invention.

Herein, the expressions "have", "may have", "include" and "comprise", or "may include" and "may comprise" used herein indicate existence of corresponding features (e.g., elements such as numeric values, functions, operations, or components) but do not exclude presence of additional features.

Further, the expressions "A or B", "at least one of A or/and B", or "one or more of A or/and B", etc., used herein, may include any and all combinations of one or more of the associated listed items. For example, the term "A or B", "at least one of A and B", or "at least one of A or B" may refer to a scenario where at least one A is included, a scenario where at least one B is included, or a scenario where both of at least one A and at least one B are included.

The terms, such as "first", "second", "third", etc., as used herein may refer to various elements of various embodiments of the present invention, but do not limit the elements. For example, such terms do not limit an order and/or priority of the elements. Further, such terms may be used to distinguish one element from another element. For example, "a first user device" and "a second user device" indicate different user devices, not an order or priority of the user devices. Accordingly, a first element may be referred to as a second element, and similarly, a second element may be referred to as a first element.

Herein, when an element (e.g., a first element) is referred to as being "(operatively or communicatively) coupled with/ to" or "connected to" another element (e.g., a second element), the first element can be directly coupled with/to or connected to the second element or an intervening element (e.g., a third element) may be present therebetween. However, when the first element is referred to as being "directly coupled with/to" or "directly connected to" the second element, there are no intervening elements (e.g., a third element) therebetween.

The expression "configured to" used herein may be used as, for example, the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor), which may perform corresponding operations by executing one or more software programs which are stored in a memory device.

The terms of a singular form may include plural forms unless otherwise specified.

Unless otherwise specified, all terms used herein, which include technical or scientific terms, have the same meanings that are generally understood by a person skilled in the art. It will be further understood that terms, which are defined in a dictionary and commonly used, should also be interpreted as customary in the relevant related art and not in an idealized or overly formal detect unless expressly so defined herein in various embodiments of the present invention. In some cases, even if terms are defined in the specification, they may not be interpreted to exclude embodiments of the present invention.

An electronic device according to an embodiment of the present invention may include a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, a wearable device (e.g., a head-mounted-device (HMD), such as electronic glasses), electronic apparel, an electronic bracelet, an electronic necklace, an electronic appcessory, an electronic tattoo, a smart watch, etc.

Further, an electronic devices may be a smart home appliance, such as a television (TV), a digital versatile disc (DVD) player, an audio component, a refrigerator, an air conditioner, a cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® or PlayStation®), an electronic dictionary, an electronic key, a camcorder, an electronic picture frame, etc.

Additionally, an electronic device may be a medical device, such as a portable medical measurement device (e.g., a blood glucose monitoring device, a heartbeat measuring device, a blood pressure measuring device, a body temperature measuring device, etc.), a magnetic resonance angiography (MRA) device, a magnetic resonance imaging (MRI) device, a computed tomography (CT) device, a scanner, an ultrasonic device, a navigation device, a global positioning system (GPS) receiver, an event data recorder (EDR), a flight data recorder (FDR), a vehicle infotainment device, electronic equipment for vessels (e.g., a navigation system and a gyrocompass), avionics equipment, a security device, a head unit for a vehicle, an industrial or home robot, an automatic teller machine (ATM), a point of sales (POS) device, or internet of things (e.g., light bulbs, various sensors, electric or gas meters, sprinkler devices, fire alarms, thermostats, street lamps, toasters, exercise equipment, hot water tanks, heaters, boilers, etc.).

An electronic devices may also be a part of furniture or buildings/structures having communication functions, electronic boards, electronic signature receiving devices, projectors, and measuring instruments (e.g., water meters, electricity meters, gas meters, and wave meters) including metal cases.

Further, an electronic device may be a flexible device.

Additionally, an electronic device according to an embodiment of the present invention may be one or more combinations of the above-mentioned example devices.

It will also be obvious to a person having ordinary skill in the art that an electronic device according to an embodiment of the present invention is not limited to the above-mentioned example devices.

Herein, the term "user" refers to a person that uses an electronic device or to another device (e.g., an artificial electronic device) that uses the electronic device.

Herein, the term "module" may represent a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

Figure 2:
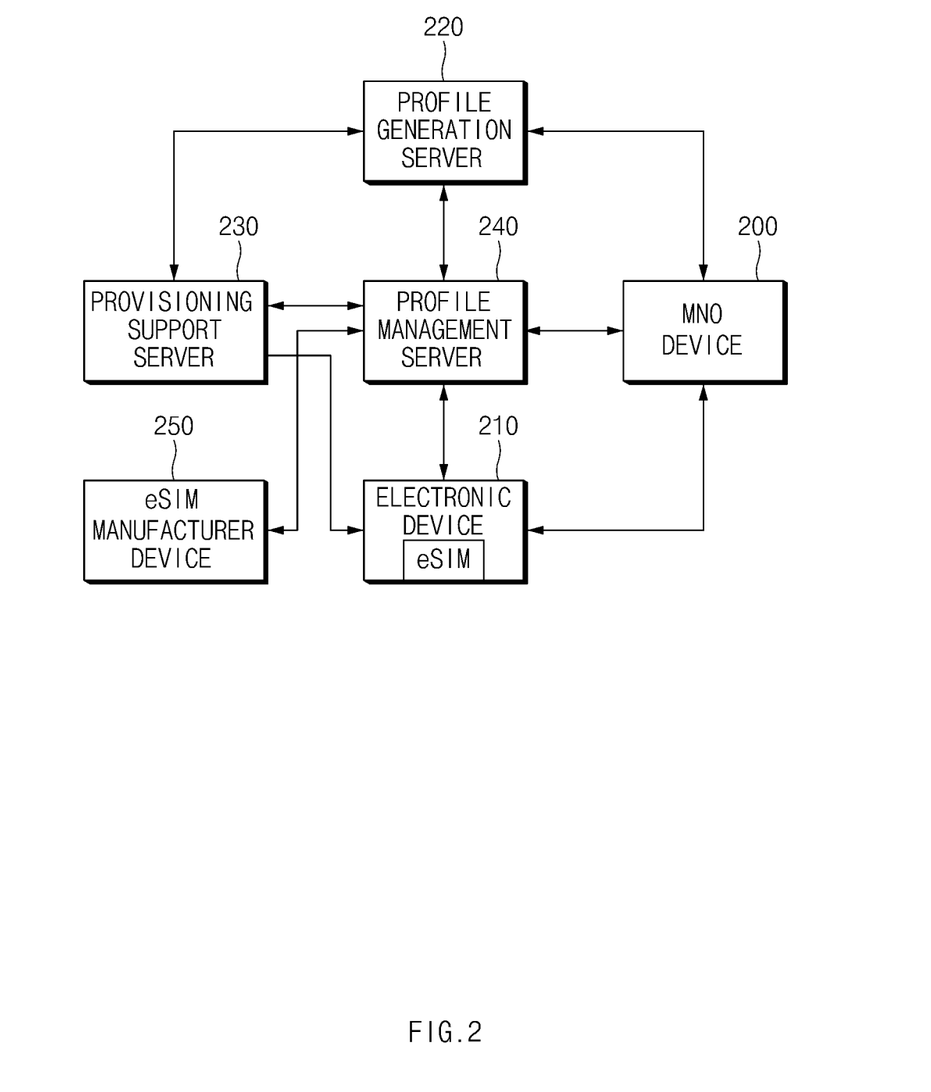
FIG. 2 illustrates a provisioning system according to an embodiment of the present invention.

FIG. 2 illustrates a provisioning system according to an embodiment of the present invention.

Referring to FIG. 2, the provisioning system includes an MNO device 200, an electronic device 210 including an eSIM, a profile generation server 220, a provisioning support server 230, a profile management server 240, an eSIM manufacturer device 250.

The MNO device 200 may transmit information (e.g., an ICCID, an ID for identifying the profile management server 240 (an SDID), subscription information, etc.) for creating a profile, to the profile generation server 220. The MNO device 200 may exchange data with a plurality of profile generation servers 220 or a plurality of profile management server 240.

The electronic device 210 includes the eSIM. The electronic device 210 may download and install a profile generated at the profile generation server 220 through the provisioning support server 230 or the profile management server 240. For example, the profile may indicate a subscriber information combination as a combination of a file structure, data and applications associated with a specific subscriber of a specific mobile communication provider. The profile may also include both a subscriber profile (corresponding to an MNO profile) and a provisioning profile.

The profile generation server 220 (e.g., subscription manager-data preparation (SM-DP)) may create a profile to be installed on the eSIM, based on information transmitted from the MNO device 200 or the eSIM manufacturer device 250. The profile generation server 220 may transmit the created profile to the provisioning support server 230 or the profile management server 240. The profile generation server 220 may perform authentication with a server (e.g., the provisioning support server 230 or the profile management server 240), which will transmit the created profile, in order to securely transmit the created profile.

The profile generation server 220 may determine whether to transmit the created profile to the provisioning support server 230 or to the provisioning management server 240, based on information from the MNO device 200. The profile generation server 220 may identify a profile management server 240, which will transmit the created profile, from among a plurality of provisioning management servers.

The provisioning support server 230 may receive the created profile from the profile generation server 220. For example, the provisioning support server 230 may receive a plurality of packets (e.g., application protocol data units (APDUs)) corresponding to a profile from the profile generation server 220.

According to an embodiment of the present invention, the provisioning support server 230 may receive a plurality of packets corresponding to a plurality of profiles from the profile generation server 220. The provisioning support server 230 may receive a plurality of packets corresponding to the plurality of profiles in bulk from the profile generation server 220, e.g., using a dedicated line.

The provisioning support server 230 may generate an image file corresponding to the profile, based on the plurality of received packets. The provisioning support server 230 may transmit the generated image file to the electronic device 210 and may authenticate the electronic device 210 using pre-defined key set information, information associated with an external device to be used upon provisioning (e.g., a voltage or current setting value of a jig), or a combination of the pieces of information.

According to an embodiment of the present invention, the provisioning support server 230 may download and install a test profile for development or verification, as well as a commercial profile, such as a provisioning profile, a subscriber profile, etc., on the electronic device 210.

According to an embodiment of the present invention, the provisioning support server 230 may connect to the profile management server 240 to notify statuses such as installation, enable/disable, etc., of the profile.

According to an embodiment of the present invention, the provisioning support server 230 may be a server independent of the profile management server 240, may be included in the profile management server 240, or may be formed of a server. Accordingly, the profile management server 240 may support functions that the provisioning support server 230 performs.

When a user intends to change a subscriber profile installed on an eSIM to a subscriber profile of another mobile communication provider during an operation of the electronic device 210, the electronic device 210 may connect to the profile management server 240 to receive, e.g., an image file generated at the profile management server 240, and may change the subscriber profile based on the received image file.

The profile management server 240 (e.g., a subscription manager-secure routing (SM-SR)) may perform overall management on the eSIM included in the electronic device 210. For example, the profile management server 240 may perform a function for checking and/or managing installation, deletion, enabling, disabling, etc., of a profile in the eSIM.

The profile management server 240 may exchange data with a plurality of profile generation servers 220 or a plurality of provisioning support server 230.

The eSIM manufacturer device 250 may provide the profile management server 240 with information associated with the eSIM (e.g., an eUICC information set (EIS)).

Figure 3:
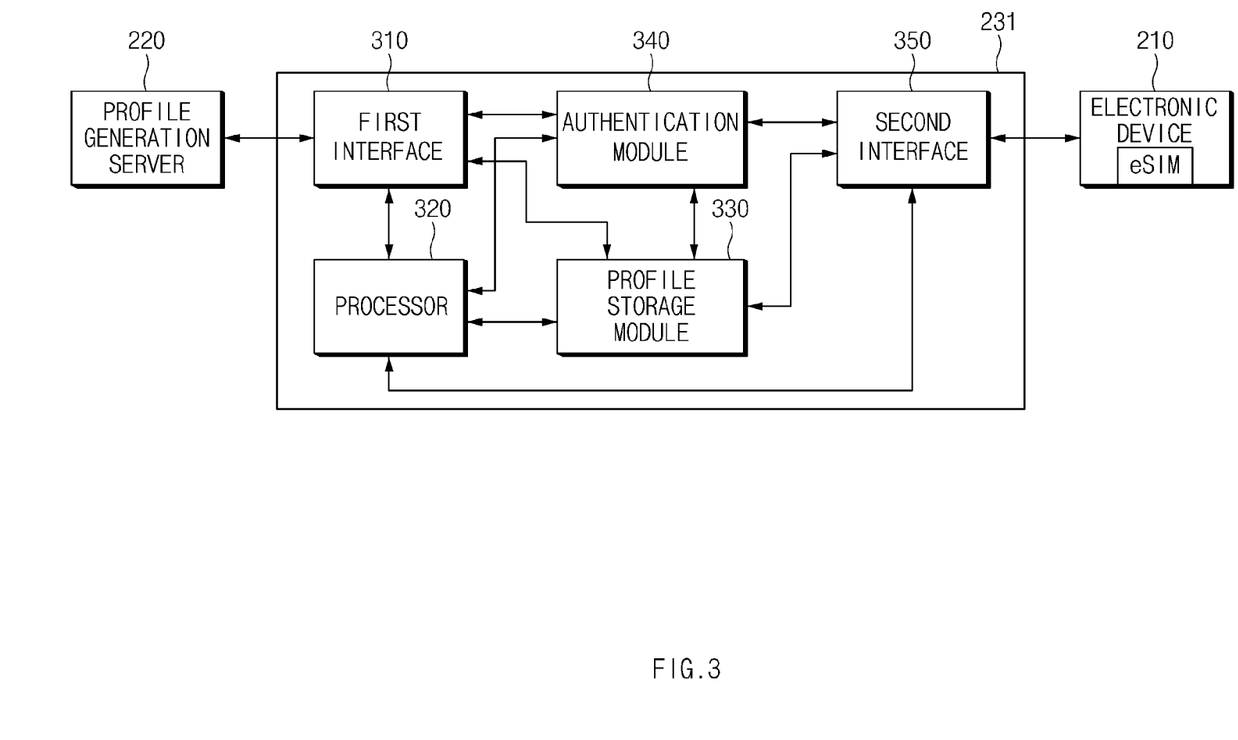
FIG. 3 illustrates a server device according to an embodiment of the present invention.

FIG. 3 illustrates a server device according to an embodiment of the present invention. For example, a server device 231 in FIG. 3 may correspond to the provisioning support server 230 illustrated in FIG. 2. Alternatively, if the provisioning support server 230 and the profile management server 240 are integrated in a profile management server, the server device 231 may correspond to the integrated profile management server.

Referring to FIG. 3, the server device 231 includes a first interface 310, a processor 320, a profile storage module 330, an authentication module 340, and a second interface 350.

The first interface 310 may transmit and receive data to and from the profile generation server 220. For example, the first interface 310 may transmit a request message requesting a profile or a plurality of profiles from the profile generation server 220. The request message may include at least one of the number of the plurality of profiles, MNO information, an ID of the profile generation server 220, or a profile type (e.g., prepayment, deferred payment, etc.).

The first interface 310 may receive a plurality of packets corresponding to a profile, in response to the request message. When the first interface 310 transmits a request message for a plurality of profiles, the first interface 310 may receive a plurality of packets corresponding to the plurality of profiles.

The first interface 310 may receive the plurality of packets from the profile generation server 220 using a dedicated line. Accordingly, the server device 231 may quickly receive a plurality of packets corresponding to one or more profiles from the profile generation server 220.

The processor 320 may generate an image file corresponding to a profile from the plurality of packets. When the first interface 310 receives a plurality of packets corresponding to a plurality of profiles, the processor 320 may generate a plurality of image files corresponding to the plurality of profiles from the plurality of packets.

The profile storage module 330 may store packets received through the first interface 310 and an image file generated by the processor 320.

The authentication module 340 may perform authentication with the profile generation server 220 and authenticate the electronic device 210 connected through the second interface 350. For example, the authentication module 340 may authenticate the electronic device 210 using a pre-defined key set. The authentication module 340 may authenticate the electronic device 210 using pre-defined key set information, information associated with an external device to be used upon provisioning (e.g., a voltage or current setting value of a jig), or a combination of the pieces of information.

If the electronic device 210 is authenticated, the second interface 350 may transmit the image file to the electronic device 210, e.g., using a wired cable.

According to an embodiment of the present invention, the second interface 350 may transmit a command for the electronic device 210 to initiate a test profile installation process for installing a test profile.

According to an embodiment of the present invention, the second interface 350 may store the image file at a security area of the electronic device 210. Accordingly, if the electronic device 210 is booted up, a profile may be installed on the eSIM based on the stored image file.

Although not illustrated, the server device 231 may further include a profile management module for managing installation, deletion, activation, and/or inactivation of the profile. The profile management module may include a function of a profile management server 240 for transmitting a plurality of packets from the profile generation server 220 to the electronic device 210 in an OTA manner.

Figure 4:
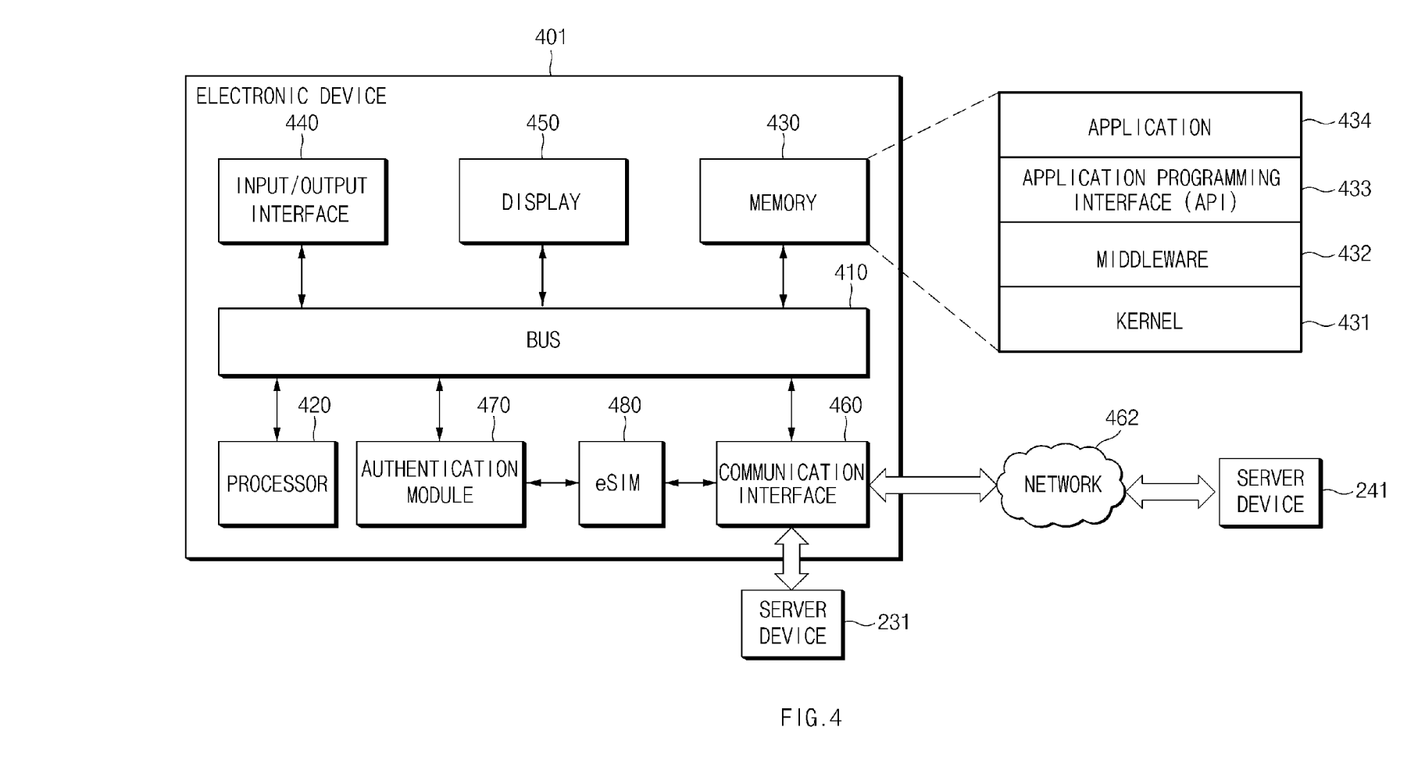
FIG. 4 illustrates an electronic device according to an embodiment of the present invention.

FIG. 4 illustrates an electronic device according to an embodiment of the present invention.

Referring to FIG. 4, an electronic device 401 includes a bus 410, a processor 420, a memory 430, an input/output interface 440, a display 450, a communication interface 460, an authentication module 470, and an eSIM 480.

The bus 410 interconnects the above-described components and may convey communications (e.g., a control message) among the above-described components.

The processor 420 may install a profile on the eSIM, based on a plurality of packets received from a server (e.g., a provisioning support server 230 or a provisioning management server 240) authenticated by the authentication module 470. For example, the processor 420 may install a profile on the eSIM 480, based on a plurality of packets (e.g., APDUs) from the server device 241 (a profile management server 240).

The processor 420 may also initiate a process for installing a profile using an image file, in response to an input event. For example, the processor 420 may receive authentication information processed at the authentication module 470 as an input event, and initiate the process in response thereto. Alternatively, the processor 420 may receive a type of received data as the input event or may receive a user input as the input event.

The processor 420 may store an image file at a security area of the memory 430, based on the image file from the server device 231 (the provisioning support server 230). If the electronic device 401 is booted up, the processor 420 may load an image file stored at a security area of the memory 430 to install a profile on the eSIM 480.

Alternatively, the processor 420 may initiate a test profile installation process for installing a test profile, i.e., a process of installing a test profile for an equipment test, not a commercial profile (e.g., a provisioning profile or a subscriber profile), and may restrict installation of other profiles except for a the test profile having a specific attribute.

Additionally, it may be possible to replace an authentication manner (e.g., an authentication manner using a predetermined key set) for installing a profile with another authentication manner (e.g., authentication manner using information, such as a voltage or current setting value of a jig associated with an external device) or to skip an authentication procedure.

For example, based on a command from the server device 231, the processor 420 may allow the electronic device 401 to initiate the test profile installation process. In the test profile installation process, the processor 420 may install a test profile on the eSIM 480, based on an image file from the server device 231.

Alternatively, the processor 420 may change a mode of the electronic device 401 to a first mode or a second mode for installation of the profile. For example, if a mode of the electronic device 401 is changed to the first mode, the processor 420 may install a profile on the eSIM 480 using an image profile. However, if a mode of the electronic device 401 is changed to the second mode, the processor 420 may install a profile on the eSIM 480 using a plurality of packets.

The processor 420 may also change a mode of the electronic device 401 based on an authentication manner of the authentication module 470, based on a type of data received from a server (e.g., the provisioning support server 230 or the provisioning management server 240) or an external device (e.g., a jig) authenticated by the authentication module 470, based on a user input, or based on a command from a second interface 350 of the server device 231.

In the first mode, the processor 420 may store an image file at a security area of the memory 430, based on an image file from the server device 231 (e.g., the provisioning support server 230). If the electronic device 401 is booted up, the processor 420 may load an image file stored at the security area of the memory 430 to install a profile on the eSIM 480.

The processor 430 may enter a test profile installation mode, which is different from the first mode and the second mode. The test profile installation mode is for installing a test profile for an equipment test, not a commercial profile (e.g., a provisioning profile or a subscriber profile) and may restrict installation of other profiles except for the test profile having a specific attribute.

Additionally, as described above, it may be possible to replace one authentication manner for installing a profile with another authentication manner or to skip an authentication procedure.

For example, based on a command from the server device 231, the processor 420 may allow the electronic device 401 to enter the test profile installation mode. If the electronic device 401 enters the test profile installation mode, the processor 420 may install a test profile on the eSIM 480, based on an image file from the server device 231.

In the second mode, the processor 420 may install a profile on the eSIM 480, based on a plurality of packets (e.g., APDUs) from the server device 241 (the profile management server 240).

The processor 420 may receive, for example, instructions from the above-described other components (e.g., the memory 430, the input/output interface 440, the display 450, the communication interface 460, the authentication module 470, etc.) through the bus 410, decode the received instructions, and perform data processing or operations according to the decoded instructions.

The memory 430 may store data from a server (e.g., the server device 231 or the server device 241) or an external device (e.g., a jig) authenticated by the authentication module 470. For example, the memory 430 may store an image file received from the server device 231 at the security area of the memory 430 and may store a plurality of packets received from the server device 241.

The memory 430 may store instructions or data received from the processor 420 or other components (e.g., the input/output interface 440, the display 450, the communication interface 460, the authentication module 470, etc.) or generated by the processor 420 and/or the other components.

The memory 430 may store a signing key for development, a signing key for commercial use, and a unique ID of the electronic device 401.

As illustrated in FIG. 4, the memory 430 includes, for example, programming modules, i.e., a kernel 431, a middleware 432, an application programming interface (API) 433, and an application 434. Each of the above-described programming modules may be implemented in the form of software, firmware, hardware, or a combination of at least two thereof.

The kernel 431 may control or manage system resources (e.g., the bus 410, the processor 420, the memory 430, etc.) that are used to execute operations or functions of remaining other programming modules, for example, the middleware 432, the API 433, and/or the application 434. Further, the kernel 431 may provide an interface that allows the middleware 432, the API 433, or the application 434 to access discrete components of the electronic device 401 in order to control or manage the middleware 432, the API 433, and/or the application 434.

The middleware 432 may perform a mediation role such that the API 433 or the application 434 communicates with the kernel 431 to exchange data. Further, for task requests received from the application 434, for example, the middleware 432 may perform a control (e.g., scheduling or load balancing) on a task request using a method of assigning the priority, which makes it possible to use a system resource (e.g., the bus 410, the processor 420, the memory 430, etc.) of the electronic device 401, to the application 434.

The API 433 may be an interface through which the application 434 controls a function provided by the kernel 431 or the middleware 432, and may include, for example, at least one interface or function (e.g., an instruction) for a file control, a window control, image processing, a character control, etc.

Examples of the application 434 may include a short messaging service/multimedia messaging service (SMS/MMS) application, an e-mail application, a calendar application, an alarm application, a health care application (e.g., an application for measuring an exercise amount, a blood sugar, etc.), and an environment information application (e.g., an application for measuring air pressure, humidity, temperature information, etc.).

Additionally, the application 434 may be associated with information exchange between the electronic device 401 and an external electronic device. For example, the application associated with information exchange may include a notification relay application for transmitting specific information to an external electronic device or a device management application for managing an external electronic device.

The notification relay application may include a function for providing an external electronic device with notification information generated from another application (e.g., a message application, an e-mail application, a health care application, an environment information application, etc.) of the electronic device 401. Additionally, the notification relay application may receive notification information from an external electronic device and may provide it to a user.

Additionally, the device management application may manage (e.g., install, delete, or update) a function (e.g., turn on/turn off of an external electronic device itself (or a portion of a constituent part) or control of brightness (or resolution) of a screen) of at least a portion of the external electronic device communicating with the electronic device 401, an application operating on the external electronic device, or a service (e.g., a communication (or telephone) service or a message service) provided by the external electronic device.

The application 434 may be designated according to an attribute (e.g., the kind of electronic device) of the external electronic device. For example, when the external electronic device is an MP3 player, the application 434 may be associated with music reproduction. Similarly, when the external electronic device is a mobile medical device, the application 434 may be associated with health care.

The application 434 may also be designated to the electronic device 401 or received from the external electronic device.

The I/O interface 440 may receive a user input associated with installation of the profile.

The I/O interface 440 may transmit an instruction or data, input from a user through an input/output device (e.g., a sensor, a keyboard, or a touch screen), to the processor 420, the memory 430, the communication interface 460, and/or the authentication module 470, for example, through the bus 410. For example, the I/O interface 440 may provide the processor 420 with a user's touch data input through a touch screen. Further, the I/O interface 440 may output an instruction or data, received from the processor 420, the memory 430, the communication interface 460, and/or the authentication module 470 through the bus 410, through the input/output device (e.g., a speaker or a display). For example, the I/O interface 440 may output voice data, which is processed through the processor 420, to the user through a speaker.

The display 450 may display a variety of information (e.g., multimedia data, text data, etc.) for the user.

The communication interface 460 may establish communication between the electronic device 401 and an external electronic device (e.g., a server 231 or 241). The communication interface 460 may receive an application from an external device.

For example, the communication interface 460 may be connected to a network 462 through wireless communication or wired communication to communicate with the external electronic device. Examples of the wireless communication may include at least one of wireless-fidelity (Wi-Fi), Bluetooth (BT), near field communication (NFC), global positioning system (GPS), or cellular communication, e.g., through a $3^{rd}$ generation (3G), a long term evolution (LTE), an LTE-advanced (LTE-A), a code division multiple access (CDMA), a wideband code division multiple access (WCDMA), a universal mobile telecommunications system (UMTS), a wireless broadband (WiBro), or a global system for mobile communications (GSM) communication system). Examples of wired communication may include at least one of a universal serial bus (USB), a high definition multimedia interface (HDMI), a recommended standard-232 (RS-232), or a plain old telephone service (POTS).

The network 462 may be a telecommunications network including at least one of a computer network, an internet, an internet of things, or a telephone network. A protocol (e.g., a transport layer protocol, a data link layer protocol, or a physical layer protocol) for communication between the electronic device 401 and an external device may be supported by at least one of the kernel 431, the middle ware 432, the application programming interface 433, the application 434, or the communication interface 460.

The authentication module 470 may authenticate a server device (e.g., a server device 231 or a server device 241), which transmits a profile to the electronic device 401, or an external device (e.g., a jig) that is connected to the electronic device 401 and transmits a profile.

For example, the authentication module 470 may perform authentication with the server device 231. The authentication module 470 may perform authentication with the server device 231 using pre-defined key set information, information (e.g., a voltage or current setting value of a jig) associated with an external device to be used upon provisioning, or a combination of the pieces of information.

The eSIM 480 may store a profile installed according to an image file received from the server device 231. The communication interface 460 may connect to a provider network corresponding to subscription information of the profile, using a profile included in the eSIM 480.

Figure 5:
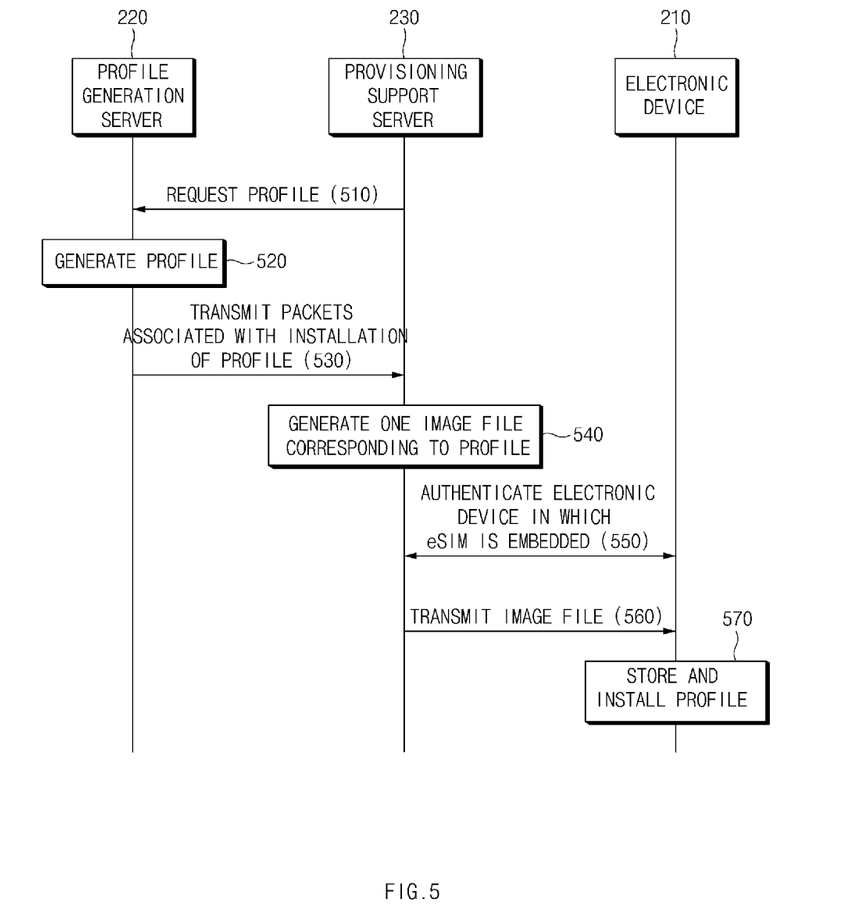
FIG. 5 is a flow chart illustrating an eSIM provisioning method according to an embodiment of the present invention.

FIG. 5 is a flow chart illustrating an eSIM provisioning method according to an embodiment of the present invention.

The flow chart illustrated in FIG. 5 includes operations processed at a profile generation server 220, a server device (a provisioning support server 230), and an electronic device 210, as illustrated in FIGS. 2 and 3.

Referring to FIG. 5, in operation 510, the provisioning support server 230 requests a profile from the profile generation server 220. For example, the provisioning support server 230 may transmit a request message for requesting a profile, to the profile generation server 220. The request message may include at least one of a profile ID, an amount of a profile, MNO information, an ID of the profile generation server 220, or a profile type.

In operation 520, the profile generation server 220 generates a profile. For example, the profile generation server 220 may receive information for generation of a profile from an MNO device 200 or an eSIM manufacturer device 250 and may generate the profile based on the received information.

In operation 530, the profile generation server 220 transmits a plurality of packets (e.g., APDUs) associated with installation of the profile to the provisioning support server 230.

In operation 540, the provisioning support server 230 creates an image file corresponding to the profile from the plurality of received packets.

In operation 550, the provisioning support server 230 performs authentication with the electronic device 210 including the eSIM. For example, the provisioning support server 230 may authenticate the electronic device 210 or the eSIM using pre-defined key set information, information associated with an external device to be used upon provisioning (e.g., a voltage or current setting value of a jig), or a combination of the pieces of information.

In operation 560, the provisioning support server 230 transmits the image file to the electronic device 210, for example, using a wired cable. For example, the provisioning support server 230 may also transmit the image file to the electronic device 210 via a USB or using wireless communication.

In operation 570, the electronic device 210 stores and/or installs a profile based on the received image file. For example, the electronic device 210 may store the image file at a security area of the electronic device 210. Thereafter, if the electronic device 210 is booted up, the electronic device 210 may install a profile on the eSIM 480, based on the image file. Accordingly, the electronic device 210 may perform ISD-R authentication on the eSIM 480.

Figure 6:
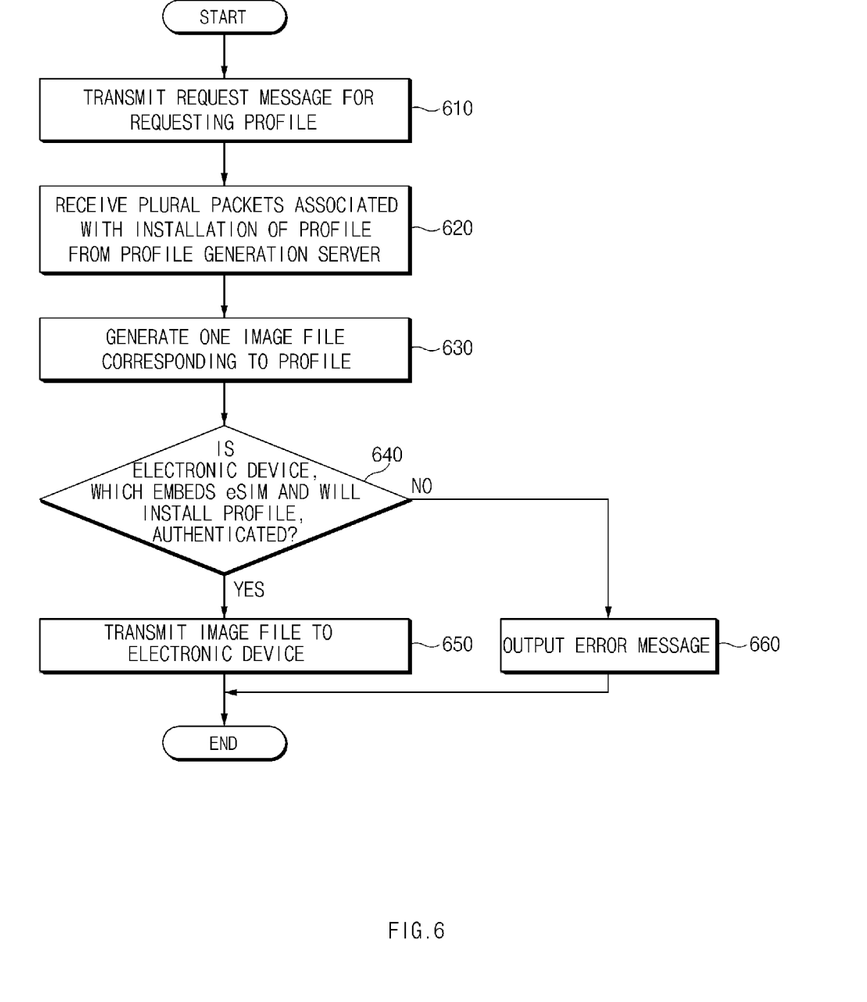
FIG. 6 is a flow chart illustrating an eSIM provisioning method according to an embodiment of the present invention.

FIG. 6 is a flow chart illustrating an eSIM provisioning method according to an embodiment of the present invention.

The flow chart illustrated in FIG. 6 includes operations processed at a server device 231 as illustrated in FIGS. 2 and 3.

Referring to FIG. 6, in operation 610, a first interface 310 of the server device transmits a request message for requesting generation of a profile, to a profile generation server 220 or an MNO device. For example, the request message may include at least one of a profile ID, an amount of a profile, MNO information, an ID of the profile generation server 220, or a profile type.

In operation 620, the first interface 310 receives a plurality of packets associated with installation of the profile and corresponding to the request, from the profile generation unit 220.

In operation 630, a processor 320 generates an image file corresponding to a profile from the plurality of packets.

In operation 640, an authentication module 340 may authenticate an electronic device 210, which will install the profile. A second interface 350 may authenticate the electronic device 210 using pre-defined key set information, information associated with an external device to be used upon provisioning (e.g., a voltage or current setting value of a jig), or a combination of the pieces of information.

If the electronic device 210 is authenticated in operation 640, the second interface 350 transmits the image file to the electronic device 210 in operation 650. However, if the electronic device 210 is not authenticated in operation 640, an error message is output, e.g., through an input/output interface of the server device 230, in operation 660.

At least a portion of an apparatus (e.g., modules or functions thereof) or a method (e.g., operations) according to the above-described embodiments of the present invention may be implemented by instructions stored in a computer-readable storage media in the form of a programmable module. The instruction, when executed by one or more processors (e.g., a processor 420), may cause the one or more processors to perform a function corresponding to the instruction. The computer-readable storage media, for example, may be the memory 430.

A computer-readable recording medium may include a hard disk, a magnetic media such as a floppy disk and a magnetic tape, an optical media such as compact disc read only memory (CD-ROM) and a digital versatile disc (DVD), a magneto-optical media such as a floptical disk, and hardware devices such as read only memory (ROM), random access memory (RAM), and a flash memory. Also, a program instruction may include a mechanical code such as code generated by a compiler and a high-level language code executable on a computer using an interpreter. The above-described hardware unit may be configured to operate via one or more software modules for performing an operation of the present disclosure, and vice versa.

A module or a programming module according to an embodiment of the present invention may include at least one of the above elements, or a portion of the above elements may be omitted, or additional other elements may be further included. Operations performed by a module, a program module, or other elements according to an embodiment of the present invention may be executed sequentially, in parallel, repeatedly, or in a heuristic method. Also, a portion of operations may be executed in different sequences, omitted, or other operations may be added.

According to various embodiments of the present invention, an eSIM provisioning method and a server device may download and install or change a profile within a shorter time by using a transmission manner using an image file. Efficiency may increase in changing or installing a profile in bulk at an electronic device manufacturer or in installing a test profile for an equipment or network test. Further, user convenience may be improved by applying the spirit and scope of the present invention to installation or changing of a profile.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A server device comprising:
    a first interface configured to transmit a request message for requesting a profile from a profile generation server, and to receive a plurality of packets associated with installation of the profile, in response to the request message;
    a processor configured to generate an image file from the plurality of packets;
    an authentication module configured to perform authentication with the profile generation server and authenticate an electronic device including an embedded SIM (eSIM); and
    a second interface configured to transmit the image file to the electronic device, if the electronic device is authenticated.

2. The server device of claim 1, wherein the first interface is further configured to transmit a request message for requesting a plurality of profiles, and to receive a plurality of packets corresponding to the plurality of profiles.

3. The server device of claim 1, wherein the authentication module is further configured to authenticate the electronic device using a pre-defined key set or a jig.

4. The server device of claim 1, further comprising a profile management module configured to manage at least one of installation, deletion, activation, and inactivation of the profile.

5. The server device of claim 4, wherein the profile management module is further configured to transmit a plurality of packets transmitted from the profile generation server to the electronic device in an over the air (OTA) manner.

6. The server device of claim 1, wherein the second interface is further configured to transmit a command permitting the electronic device to enter a test profile installation mode.

7. The server device of claim 1, wherein the request message comprises at least one of a profile identifier (ID), an amount of the profile, mobile network operator (MNO) information, an ID of the profile generation server, and a profile type.

8. The server device of claim 1, wherein the first interface is further configured to receive the plurality of packets from the profile generation server using a dedicated line.

9. The server device of claim 1, wherein the second interface is further configured to transmit the image file to the electronic device using a wired cable.

10. The server device of claim 1, wherein the authentication module is further configured to authenticate the profile generation server using a pre-defined key set.

11. An embedded SIM (eSIM) provisioning method comprising:
    transmitting a request message for requesting a profile;
    receiving a plurality of packets associated with installation of a profile, from a profile generation server, in response to the request message;
    generating an image file corresponding to the profile from the plurality of packets;
    authenticating an electronic device including an eSIM and on which the profile is to be installed; and
    transmitting the image file to the electronic device, if the electronic device is authenticated.

12. The eSIM provisioning method of claim 11, wherein the request message is for requesting a plurality of profiles, and wherein receiving the plurality of packets comprises receiving a plurality of packets corresponding to the plurality of profiles.

13. The eSIM provisioning method of claim 11, further comprising transmitting a command permitting the electronic device to enter a test profile installation mode.

14. The eSIM provisioning method of claim 11, further comprising managing at least one of installation, deletion, activation, and inactivation of the profile.

15. The eSIM provisioning method of claim 11, wherein the request message comprises at least one of a profile identifier (ID), an amount of the profile, mobile network operator (MNO) information, an ID of a profile generation server, and a profile type.

16. An electronic device comprising:
   an authentication module configured to authenticate a server transmitting a profile to the electronic device;
   a memory configured to store data received from the server authenticated by the authentication module;
   an embedded SIM (eSIM) on which the profile is installed; and
   a processor configured to initiate a process of installing the profile on the eSIM using an image file, based on whether an input event is received.

17. The electronic device of claim 16, wherein the processor is further configured to receive authentication information processed by the authentication module as the input event.

18. The electronic device of claim 16, wherein the processor is further configured to identify a type of the received data as the input event.

19. The electronic device of claim 16, further comprising an input/output interface configured to receive a user input associated with installation of the profile,
   wherein the processor is further configured to receive the user input as the input event.

20. The electronic device of claim 16, wherein if the input event is not received, the processor is further configured to install the profile, based on a plurality of packets received from the server.

* * * * *